US012670345B2

(12) United States Patent
Potter et al.

(10) Patent No.: US 12,670,345 B2
(45) Date of Patent: Jun. 30, 2026

(54) DATA CAPTURE DEVICE

(71) Applicant: ZEBRA TECHNOLOGIES CORPORATION, Lincolnshire, IL (US)

(72) Inventors: Jason Y. Potter, New York, NY (US); Eric Z. Brennan, Lindenhurst, NY (US); Yegor D. Sinelnikov, Port Jefferson, NY (US); Eric Trongone, Coram, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/659,962

(22) Filed: May 9, 2024

(65) Prior Publication Data

US 2025/0348697 A1 Nov. 13, 2025

(51) Int. Cl.
G06K 7/10 (2006.01)

(52) U.S. Cl.
CPC .................... G06K 7/10386 (2013.01); G06K 2007/10524 (2013.01)

(58) Field of Classification Search
CPC ................. G06K 7/10386; G06K 2007/10524
See application file for complete search history.

(56) References Cited

U.S. PATENT DOCUMENTS

2015/0178539 A1* 6/2015 Gerst, III ............. G06K 7/1098
235/472.01
2015/0304767 A1* 10/2015 Mori ........................ H04R 1/44
381/334

* cited by examiner

*Primary Examiner* — Jamara A Franklin
(74) *Attorney, Agent, or Firm* — Yuri Astvatsaturov

(57) ABSTRACT

An example handheld data capture device may include a housing including a head portion and a handle portion extending from the head portion, the head portion having an external wall with a hole formed therethrough. A data capture module is positioned within the housing and an audio device is positioned within and mounted to the housing. A water impermeable membrane is secured to an external surface of the external wall of the housing and covers the hole. A cavity is located between the audio device and the water impermeable membrane. The audio device is configured to resonate at a first frequency and cause the water impermeable membrane to resonate at a second frequency, different that the first frequency.

27 Claims, 8 Drawing Sheets

DATA CAPTURE DEVICE

BACKGROUND

In some devices, for example data capture devices, it can be challenging to achieve sufficiently loud audio indications at a desired frequency while maintaining appropriate seal specifications and cleanability for the device. Currently, data capture devices typically use an audio device and a contained volume of air within the device and an open port between the air volume and the free air external to device to produce audio indications. Achieving a high sound pressure level is done by tuning the geometry of the air volume to resonate at the desired frequency. However, this requires an open port between the inside of the device and the environment external to the device, which reduces the sealing and cleanability of the device. Positioning the port is also difficult, as most acceptable positions for the port are either susceptible to liquids above the device or are positioned where a user's hand can block the port. In an attempt to improve sealing some device incorporate an expanded polytetrafluoroethylene (ePTFE) acoustic membrane to cover the port and improve the sealing of the device, but incorporation of ePTFE membranes can be prohibitively expensive.

Therefore, there is a need for devices, particularly data capture devices and handheld data capture devices, that can produce audio indications of a sufficient audio level, while maintaining sufficient sealing and cleanability of the device.

SUMMARY

In an embodiment, the present invention is a handheld data capture device including a housing including a head portion and a handle portion extending from the head portion. The head portion has an external wall and a hole formed through the external wall. A data capture module is positioned within the housing and an audio device is positioned within and mounted to the housing. A water impermeable membrane is secured to an external surface of the external wall of the housing and covers the hole. A cavity is located between the audio device and the water impermeable membrane and the audio device is configured to resonate at a first frequency and cause the water impermeable membrane to resonate at a second frequency, different than the first frequency.

In a variation of this embodiment, the cavity is defined by the audio device, the water impermeable membrane, and the hole in the external wall of the housing.

In another variation of this embodiment, the cavity is formed by the housing between the audio device and the hole in the external wall of the housing.

In another variation of this embodiment, the data capture module includes an imaging sensor having a field-of-view directed through a window in the head portion of the housing.

In another variation of this embodiment, the second frequency is greater than or equal to 1000 Hz and less than or equal to 5000 Hz.

In another variation of this embodiment, a sound level produced by the water impermeable membrane is greater than or equal to 65 decibels (dB) at a distance of 2 feet from the water impermeable membrane.

In another variation of this embodiment, the water impermeable membrane environmentally seals the hole in the external wall of the housing and the cavity from an environment external to the housing.

In another variation of this embodiment, the water impermeable membrane is a water impermeable polymer membrane.

In another variation of this embodiment, the housing includes a support extending across the hole in the external wall of the housing.

In another embodiment, the present invention is a data capture device including a housing having an external wall and a hole formed through the external wall. A data capture module is positioned within the housing and an audio device is positioned within and mounted to the housing. A water impermeable membrane is secured to an external surface of the external wall of the housing and covers the hole. A cavity is located between the audio device and the water impermeable membrane and the audio device is configured to resonate at a first frequency and cause the water impermeable membrane to resonate at a second frequency, different than the first frequency.

In a variation of this embodiment, the cavity is defined by the audio device, the water impermeable membrane, and the hole in the external wall of the housing.

In another variation of this embodiment, the cavity is formed by the housing between the audio device and the hole in the external wall of the housing.

In another variation of this embodiment, the data capture module includes an imaging sensor having a field-of-view directed through a window in the housing.

In another variation of this embodiment, the housing includes a lower housing portion with an upper surface facing a product scanning region, an upper housing portion extending above the lower housing portion. A generally horizontal window is positioned at the upper surface of the lower housing portion and a generally upright window is positioned in the upper housing portion. The data capture module includes an imaging sensor having a field-of-view that is at least partially directed through the generally horizontal window and/or the generally upright window.

In another variation of this embodiment, the second frequency is greater than or equal to 1000 Hz and less than or equal to 5000 Hz.

In another variation of this embodiment, a sound level produced by the water impermeable membrane is greater than or equal to 65 decibels (dB) at a distance of 2 feet from the water impermeable membrane.

In another variation of this embodiment, the water impermeable membrane environmentally seals the hole in the external wall of the housing and the cavity from an environment external to the housing.

In another variation of this embodiment, the water impermeable membrane is a water impermeable polymer membrane.

In another variation of this embodiment, the housing includes a support extending across the hole in the external wall of the housing.

In another embodiment, the present invention is a device, including a housing having an external wall and a hole formed through the external wall. An audio device is positioned within and mounted to the housing and a water impermeable membrane is secured to an external surface of the external wall of the housing and covers the hole. A cavity is located between the audio device and the water impermeable membrane and the audio device is configured to resonate at a first frequency and cause the water impermeable membrane to resonate at a second frequency, different than the first frequency.

In a variation of this embodiment, the cavity is defined by the audio device, the water impermeable membrane, and the hole in the external wall of the housing.

In another variation of this embodiment, the cavity is formed by the housing between the audio device and the hole in the external wall of the housing.

In another variation of this embodiment, the second frequency is greater than or equal to 1000 Hz and less than or equal to 5000 Hz.

In another variation of this embodiment, a sound level produced by the water impermeable membrane is greater than or equal to 65 decibels (dB) at a distance of 2 feet from the water impermeable membrane.

In another variation of this embodiment, the water impermeable membrane environmentally seals the hole in the external wall of the housing and the cavity from an environment external to the housing.

In another variation of this embodiment, the water impermeable membrane is a water impermeable polymer membrane.

In another variation of this embodiment, the housing includes a support extending across the hole in the external wall of the housing.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
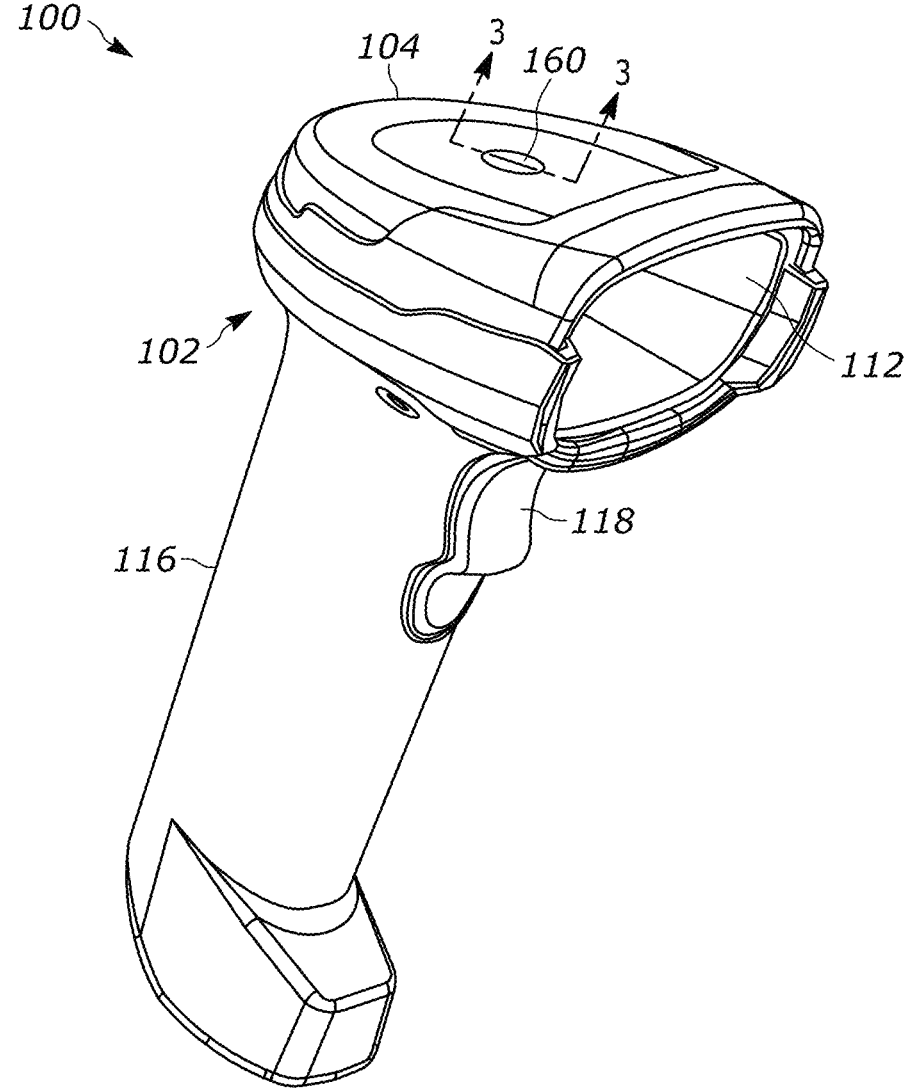
FIG. 1 illustrates a perspective view of a first example device.

Skilled artisans will appreciate that elements in the figures are illustrated for simplicity and clarity, have not necessarily been drawn to scale, and that details that are not necessary for an understanding of the invention or that render other details difficult to perceive may be omitted. For example, the dimensions of some of the elements in the figures may be exaggerated relative to other elements to help to improve understanding of embodiments of the present invention.

The apparatus components have been represented where appropriate by conventional symbols in the drawings, showing only those components and specific details that are pertinent to understanding the examples of the present invention so as not to obscure the disclosure with details that will be readily apparent to those of ordinary skill in the art having the benefit of the description herein.

DETAILED DESCRIPTION

The example devices, data capture devices, and handheld data capture devices disclosed herein produce required audio indications without an open ports in the housing of the device, while maintaining the sealing, up to IP67, and cleanability of the device. The devices disclosed herein include an audio device (e.g., a speaker, a beeper, etc.) that is mounted directly to the housing and positioned inside the device. A hole is formed in the housing and a water impermeable membrane (e.g., a label) is secured to an external surface of the housing, covering and sealing the hole. The water impermeable membrane acts as a resonator to create a high sound pressure level at a desired frequency and seals the hole so there are no exposed ports in the housing, which provides the desired sealing and cleanability.

Figure 2:
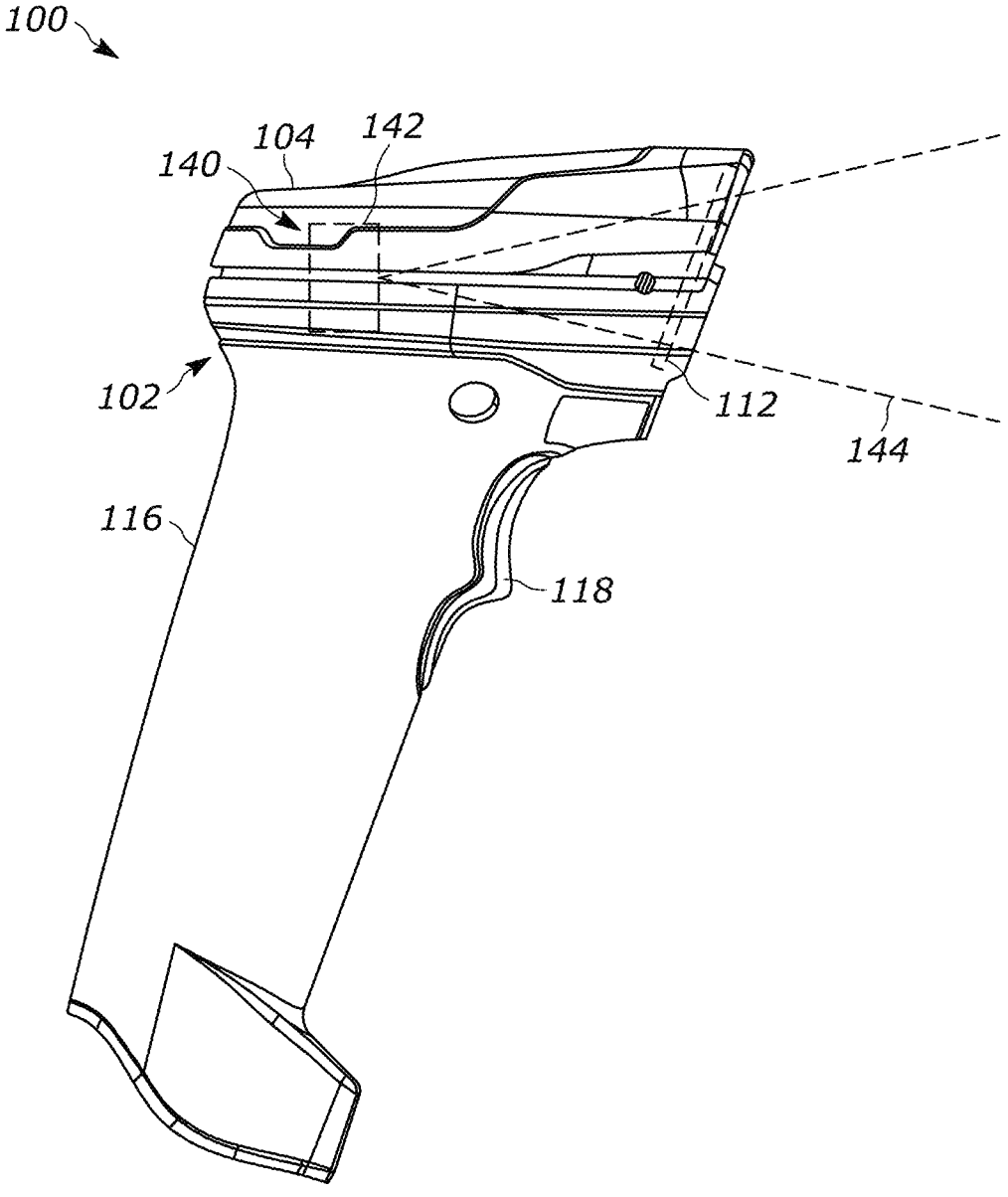
FIG. 2 illustrates a side view of the device of FIG. 1.
Figure 3:
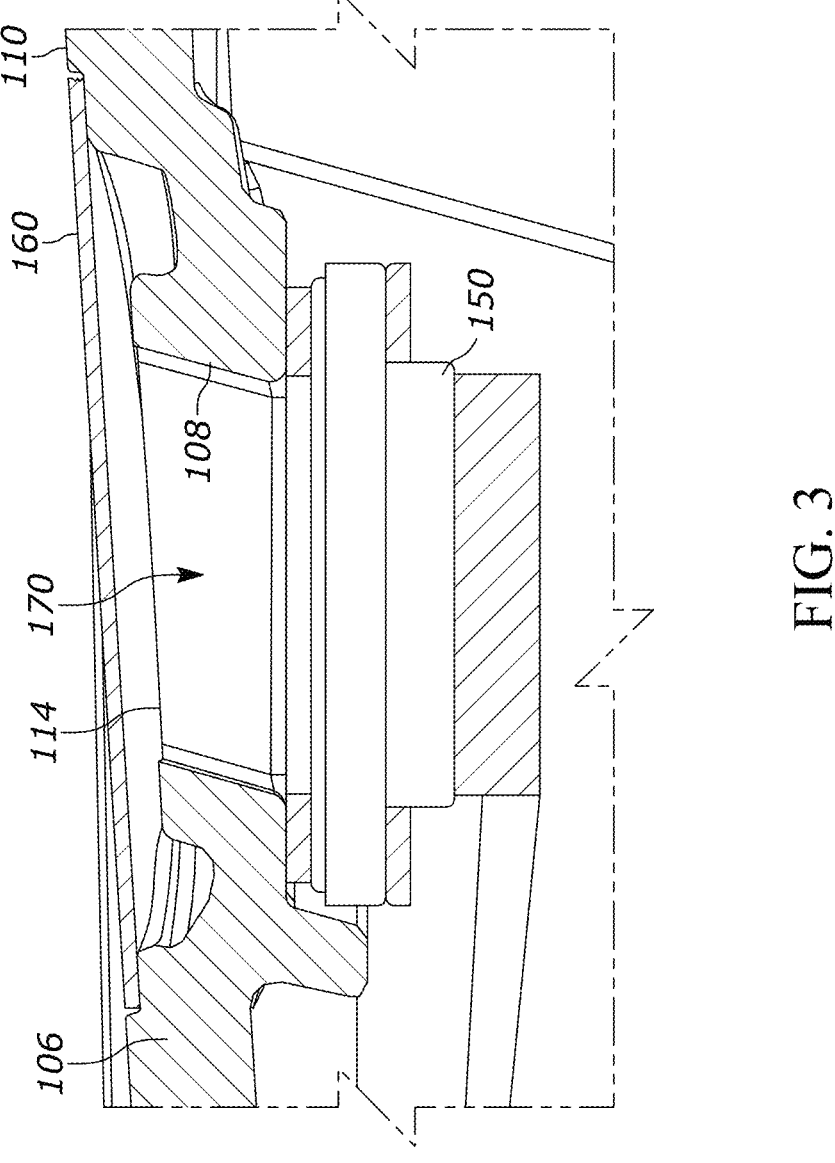
FIG. 3 illustrates a partial cross-sectional view of a portion of the device of FIG. 1, taken along line 3-3 of FIG. 1.
Figures 4A, 4B:
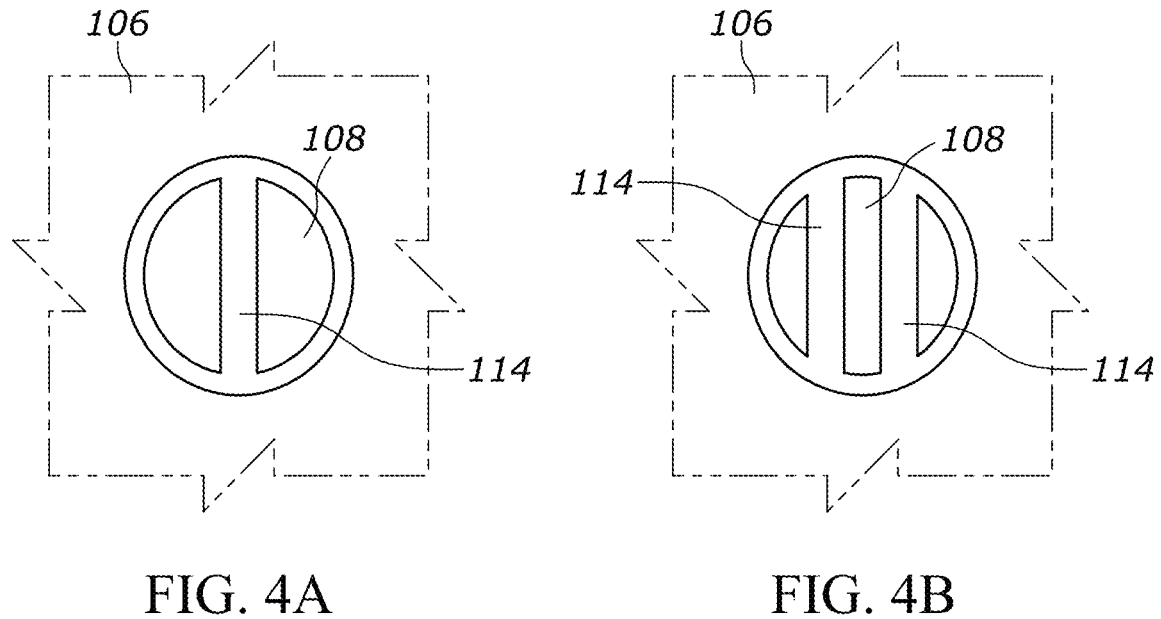
FIGS. 4A-C illustrate top views of a portion of the external wall of the device of FIG. 1 with various example arrangements of supports extending across the hole in the external wall.
Figure 4C:
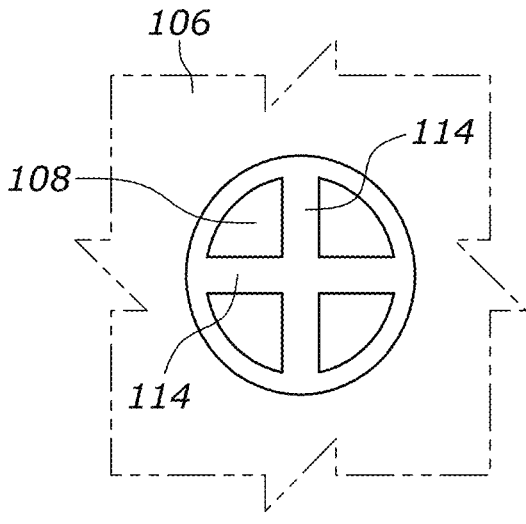

Referring to FIGS. 1-3, a first example device 100 is illustrated, which in the particular example shown is a data capture device, more particularly, a handheld data capture device. Device 100 includes a housing 102 that includes an external wall 106 and a hole 108 formed through external wall 106. An audio device 150 is positioned within and mounted to housing 102 and a water impermeable membrane 160 is secured to an external surface 110 of external wall 106 of housing 102, opposite audio device 150, and covers and seals hole 108. A cavity 170 is located between audio device 150 and water impermeable membrane 160. Cavity 170 can be formed by housing 102 between audio device 150 and hole 108 in external wall 106 of housing 102 and can be defined by audio device 150, water impermeable membrane 160, and hole 108 in external wall 106 of housing 102. Housing 102 can also have one or more support(s) 114 that extend across hole 108 to support water impermeable membrane 160 and prevent water impermeable membrane 160 from being pushed through hole 108 in external wall 106 and into cavity 170. As shown in FIGS. 4A-C, any number of support(s) 114 can be used in any configuration desired.

Water impermeable membrane 160 can be, for example, a label (e.g., a logo label) and, in some implementations, can be a water impermeable polymer membrane and can be made of various water impermeable polymer materials, such as Lexan®, Polyethylene Terephthalate (PET), polycarbonate, etc. In some implementations, water impermeable membrane 160 environmentally seals hole 108 and cavity 170 from the environment external to housing 102.

Audio device 150 can be any type of audio producing device, such as a speaker, a beeper, etc. Audio device 150 is configured to resonate at a first frequency, which causes the water impermeable membrane 160 to resonate at a second frequency, which is different than the first frequency. In some implementations, the second frequency at which water impermeable membrane 160 resonates could be greater than or equal to 1000 Hz and less than or equal to 5000 Hz, preferably greater than or equal to 2500 Hz and less than or equal to 3500 Hz. At these frequencies, water impermeable membrane 160 preferably produces a sound level that is greater than or equal to 65 decibels (dB), preferably greater than or equal to 65 dB and less than or equal to 95 dB, and more preferably 80 dB, at a distance of 2 feet from water impermeable membrane 160.

Various characteristics of water impermeable membrane 160 (e.g., thickness, stiffness, mass, radius, density, etc.), hole 108 (e.g., diameter, etc.), cavity 170 (e.g., diameter, volume, etc.), etc., can be adjusted to provide the frequency and sound level desired. For example, a single speaker with front air volume port sealed with a water impermeable membrane can be represented by a circuit schematic as shown in FIG. 8, where frequency dependent circuit imped- ances $Z_1$, $Z_2$, $Z_3$ represent the speaker, the front resonator volume, and the water impermeable membrane, respectively.

Figure 8:
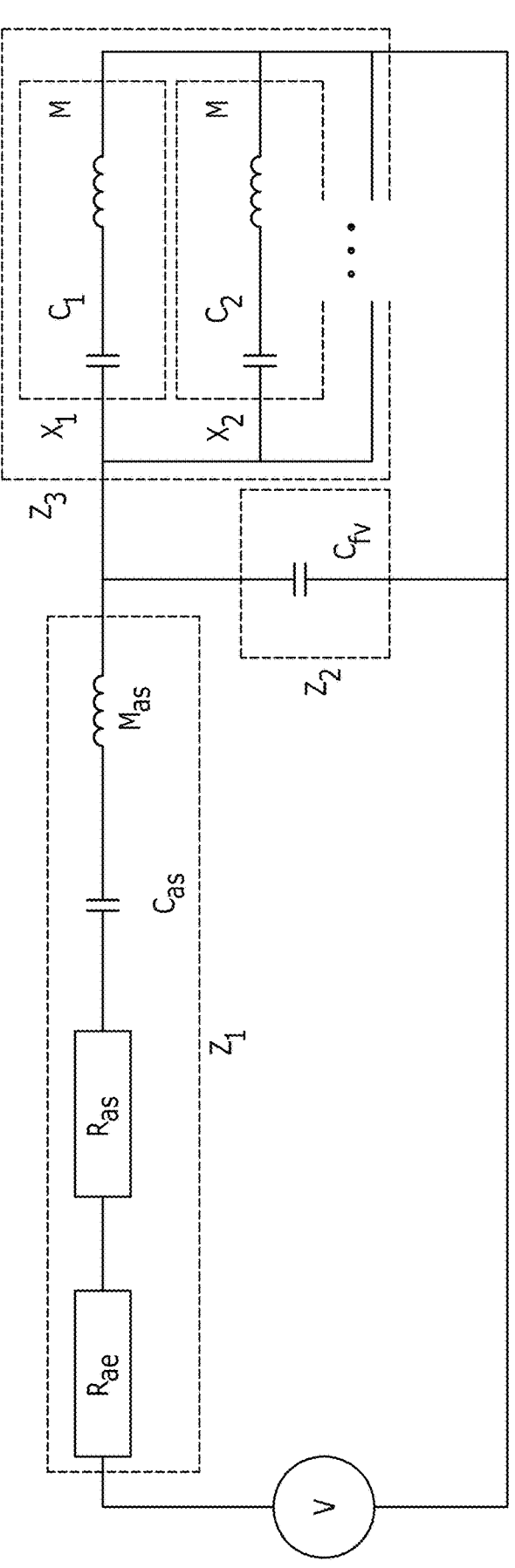
FIG. 8 illustrates a circuit schematic representing a single speaker with front air volume port sealed with a water impermeable membrane.

Based on the schematic in FIG. 8, the acoustic far field pressure produced by the water impermeable membrane can be calculated as:

$$P = \frac{\rho f}{r} \frac{V Z_2 Z_3}{W_Z X_1}$$

The above equation defines the frequency response of a system consisting of a single speaker with front air volume port sealed by a water impermeable membrane and can enable design optimization of sound pressure levels in a wide range of frequencies to achieve maximum loudness and meet a desired frequency response. In effect, this equation provides design guidance for a construction of multi-component and multi-resonance speaker-air volume-membrane system with broad range of speaker lumped elements, air volume geometry, and membrane geometrical and physical properties.

In the above equation, $Z_1$, $Z_2$, and $Z_3$ can be determined as follows:

$$Z_1 = \frac{(Bl)^2}{R_E S_D^2} + \frac{R_{ms}}{S_D^2} - \frac{i}{\omega C_{ms} S_D^2} + \frac{i\omega M_{ms}}{S_D^2} \left[ \frac{N\,s}{m^5} \right]$$

$$Z_2 = -\frac{i\rho c^2}{\omega V_f} \left[ \frac{N\,s}{m^5} \right]$$

$$Z_3 = \frac{1}{\sum_n \frac{1}{X_n}}$$

The force factor Bl [N/A], voice coil electrical resistance $R_E$ [$\Omega$], effective diaphragm area $S_D$ [m$^2$], mechanical compliance $R_{ms}$ [N·s/m], mechanical compliance $C_{ms}$ [m/N], mass $M_{ms}$ [kg] are the standard, speaker specific Thiele Small parameters. $V_f$ [m$^3$] is the front poring volume, $\rho$ [kg/m$^3$] is the air density, and c [m/s] is the sound speed in air.

In addition, in series inductor and capacitor branches $X_n$ impedances are:

$$X_n = \frac{1}{i\omega C_n} + i\omega M$$

where membrane mass in acoustic domain is:

$$M = \frac{\rho h}{S}$$

and respective compliances in acoustic domain are:

$$C_n = \frac{S^3}{\pi^2 \alpha_n^4 D \gamma_n} = \frac{12 S^3 (1 - v^2)}{\pi^3 \alpha_n^4 h^3 E}$$

6

For each branch, corresponding masses and compliances yield membrane resonance frequencies:

$$f_n = \frac{\alpha_n^2}{2S} \sqrt{\frac{D}{\rho h}}$$

where $\alpha$ is the radius of the water impermeable membrane, $S = \pi \alpha^2$ is the area, $\alpha_{n=1,2\ldots} = 3.196$, 6.306, 9.439, . . . are tabulated eigenfrequency constants, $D = Eh^3/12(1-v^2)$ is the flexural rigidity, v is Poisson's ratio, h [m] is thickness, density $\rho$ [kg/m$^3$], and E [Pa] is Young's modulus.

In the particular example shown in FIGS. 1-3, device 100 is a handheld barcode reader and housing 102 of device 100 includes a head portion 104, which includes external wall 106 with hole 108, and a handle portion 116 that extends from head portion 104. In other implementations, external wall 106 could be part of handle portion 116 and/or hole 108 could be located in other positions on housing 102. Device 100 can generally be any handheld barcode reader that includes a head portion and a handle portion that extends from the head portion, such as the Zebra® DS81. In some implementations, handle portion 116 can also include a trigger 118 that can be used to activate device 100.

A data capture module 140 is positioned within housing 102 and, in the example shown, includes an imaging sensor 142 that has a field-of-view 144 that is directed through a window 112 in head portion 104 of housing 102 to read barcodes or other indicia within field-of-view 144. In other implementations, data capture module 140 can be any type of data capture module, such as a barcode reader, a radio-frequency identification (RFID) reader, etc.

Figure 5:
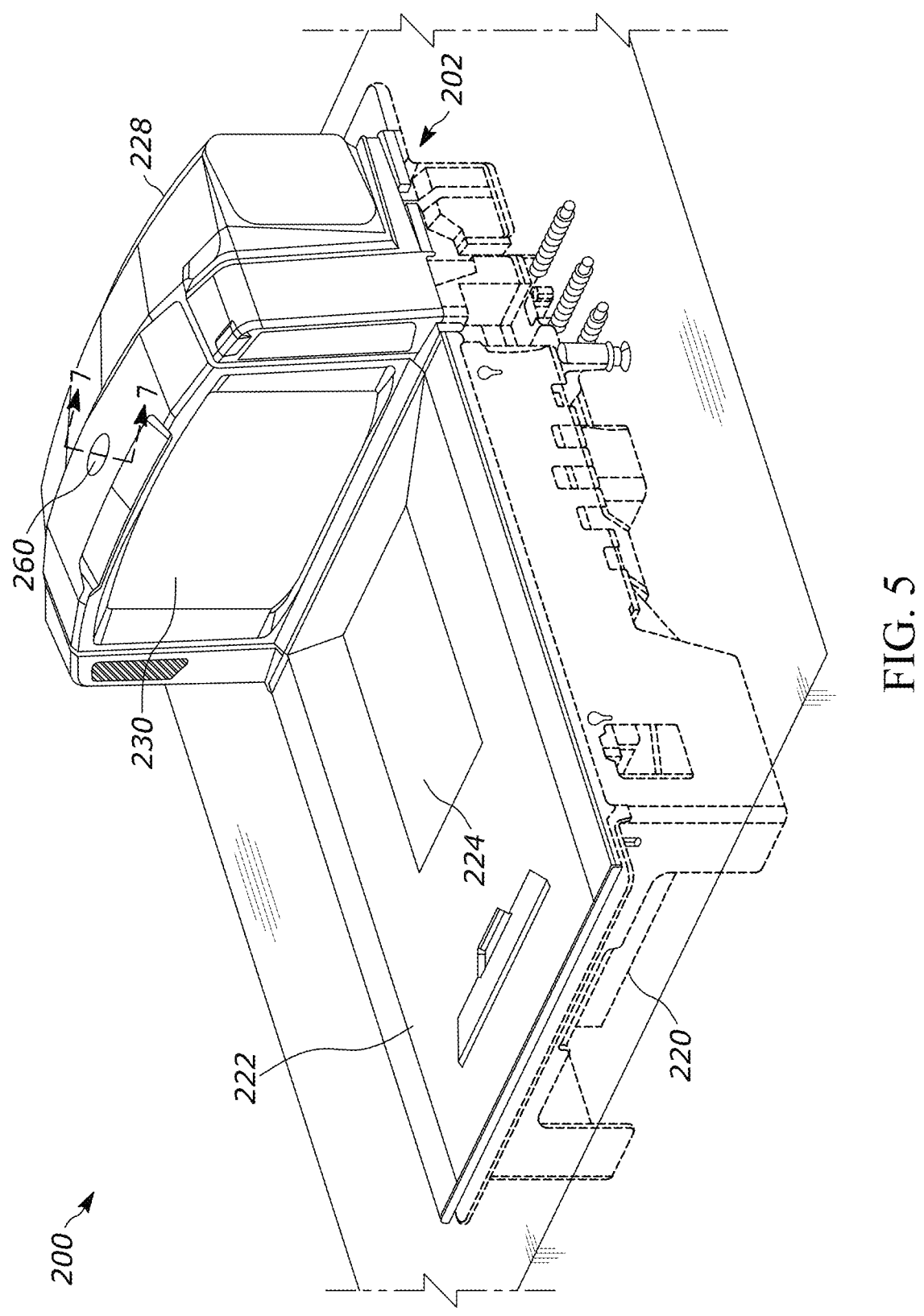
FIG. 5 illustrates a perspective view of a second example device.
Figure 6:
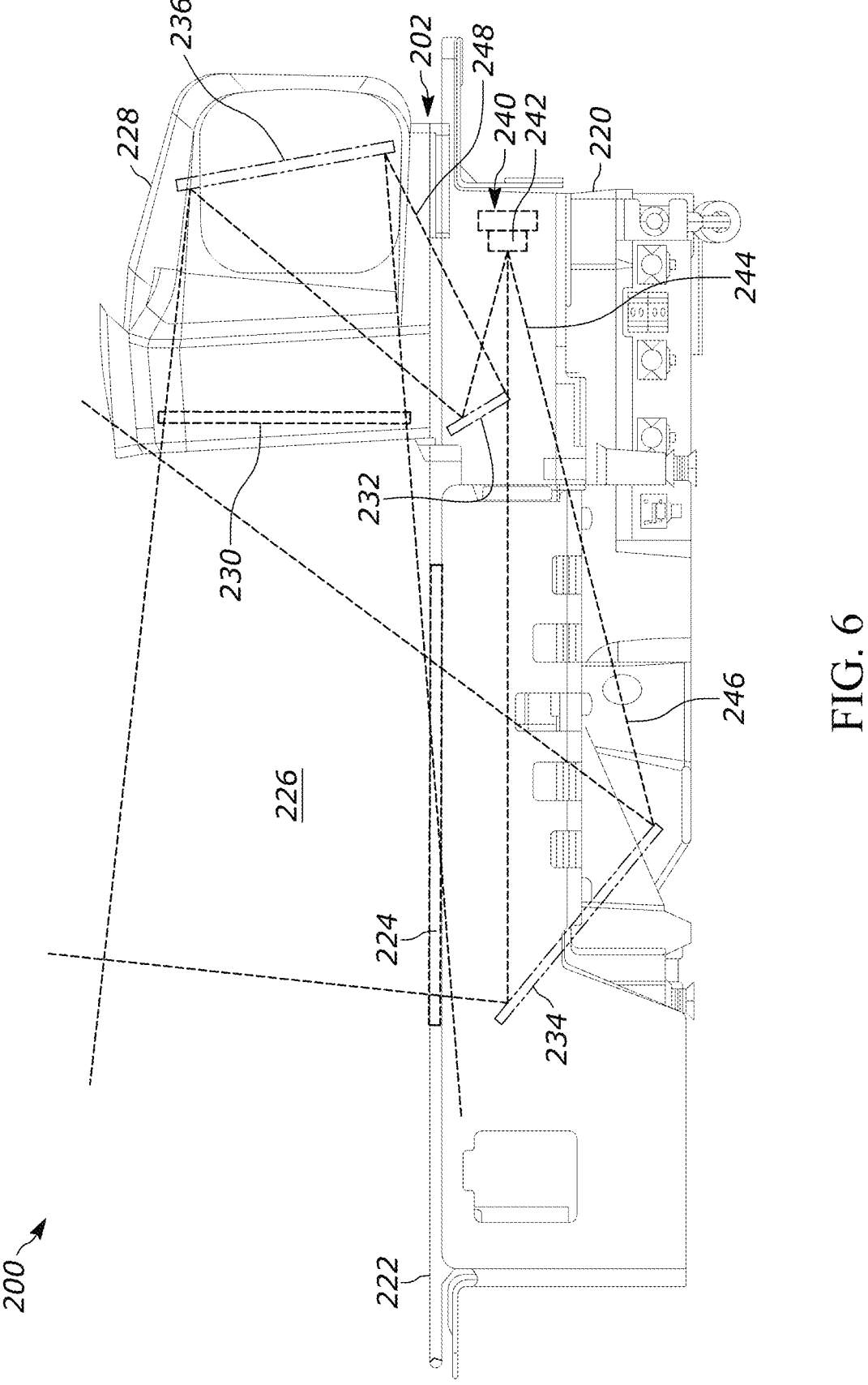
FIG. 6 illustrates a side view of the device of FIG. 5.
Figure 7:
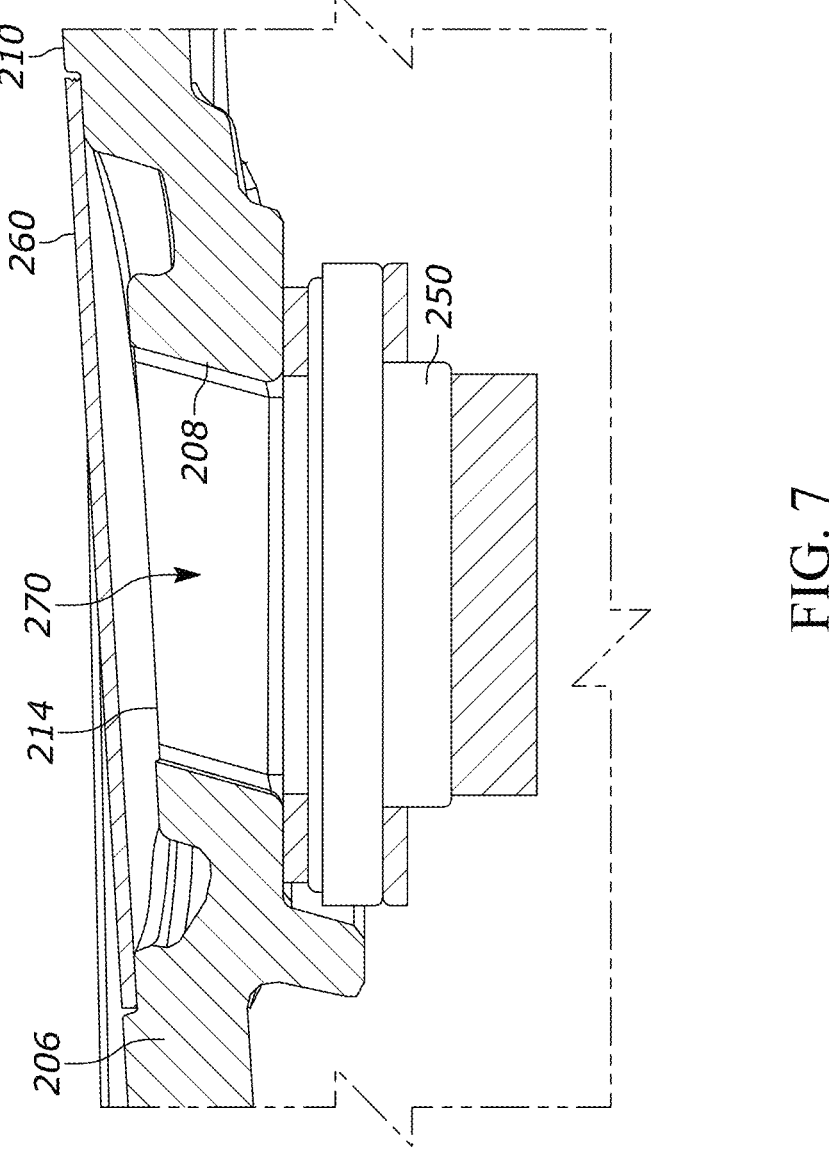
FIG. 7 illustrates a partial cross-sectional view of a portion of the device of FIG. 1, taken along line 3-3 of FIG. 1.

Referring to FIGS. 5-7, a second example device 200 is illustrated, which in the particular example shown is a data capture device, more particularly, a bioptic barcode reader. Device 200 includes a housing 202 that includes an external wall 206 and a hole 208 formed through external wall 206. An audio device 250 is positioned within and mounted to housing 202 and a water impermeable membrane 260 is secured to an external surface 210 of external wall 206 of housing 202 and covers and seals hole 208. A cavity 270 is located between audio device 250 and water impermeable membrane 260. Cavity 270 can be formed by housing 202 between audio device 250 and hole 208 in external wall 206 of housing 202 and can be defined by audio device 250, water impermeable membrane 260, and hole 208 in external wall 206 of housing 202. Housing 202 can also have one or more support(s) 214 that extend across hole 208 to support water impermeable membrane 260 and prevent water impermeable membrane 260 from being pushed through hole 208 in external wall 206 and into cavity 270. Any number of support(s) 214 can be used in any configuration desired, for example, as shown in FIGS. 4A-C for support(s) 114.

Water impermeable membrane 260 can be, for example, a label (e.g., a logo label) and, in some implementations, can be a water impermeable polymer membrane and can be made of various water impermeable polymer materials, such as Lexan®, Polyethylene Terephthalate (PET), polycarbonate, etc. In some implementations, water impermeable membrane 260 environmentally seals hole 208 and cavity 270 from the environment external to housing 202.

Audio device 250 can be any type of audio producing device, such as a speaker, a beeper, etc. Audio device 250 is configured to resonate at a first frequency and cause the water impermeable membrane 260 to resonate at a second frequency, which is different than the first frequency. In some implementations, the second frequency at which water impermeable membrane 260 resonates could be greater than or equal to 1000 Hz and less than or equal to 5000 Hz, preferably greater than or equal to 2500 Hz and less than or equal to 3500 Hz. At these frequencies, water impermeable membrane 260 preferably produces a sound level that is greater than or equal to 65 decibels (dB), preferably greater than or equal to 65 dB and less than or equal to 95 dB, and more preferably 80 dB, at a distance of 2 feet from water impermeable membrane 260.

Various characteristics of water impermeable membrane 260 (e.g., thickness, stiffness, mass, radius, density, etc.), hole 208 (e.g., diameter, etc.), cavity 270 (e.g., diameter, volume, etc.), etc., can be adjusted to provide the frequency and sound level desired and can be determined as described above.

In the particular example shown in FIGS. 5-7, device 200 is a bioptic barcode reader and housing 202 of device 200 includes a lower housing portion 220 with an upper surface 222 that faces a product scanning region 226 and an upper housing portion 228, which includes external wall 206 with hole 208, that extends above lower housing portion 220. In other implementations, external wall 206 could be part of lower housing portion 220 and/or hole 208 could be located in other positions on housing 202. A generally horizontal window 224 is positioned at upper surface 222 of lower housing portion 220 and a generally upright window 230 is positioned in upper housing portion 228.

A data capture module 240 is positioned within housing 202 and, in the example shown, includes an imaging sensor 242 that has a field-of-view 244 that is at least partially directed through generally horizontal window 224 and/or the generally upright window 230. In the particular example shown, device 200 is a bioptic barcode reader and field-of-view 244 of imaging sensor 242 is divided into a first portion 246 and a second portion 248 by a splitter mirror 232. First portion 246 of field-of-view 244 is directed by a first mirror 234 in lower housing portion 220 out of generally horizontal window 224 and second portion 248 of field-of-view 244 is directed by a second mirror 236 in upper housing portion 228 out of generally upright window 230.

The particular examples shown herein are directed to a handheld barcode reader and a bioptic barcode reader, however, it will be understood that the audio indication technology described herein can be used in other devices and data capture devices, such as kiosks, barcode readers, RFID readers, etc.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:
1. A handheld data capture device, comprising:
a housing including a head portion and a handle portion extending from the head portion, the head portion having an external wall and a hole formed through the external wall;
a data capture module positioned within the housing;
an audio device positioned within and mounted to the housing;
a water impermeable membrane secured to an external surface of the external wall of the housing and covering the hole; and
a cavity located between the audio device and the water impermeable membrane;

wherein the audio device is configured to resonate at a first frequency and cause the water impermeable membrane to resonate at a second frequency, different than the first frequency.

2. The handheld data capture device of claim 1, wherein the cavity is defined by the audio device, the water impermeable membrane, and the hole in the external wall of the housing.

3. The handheld data capture device of claim 1, wherein the cavity is formed by the housing between the audio device and the hole in the external wall of the housing.

4. The handheld data capture device of claim 1, wherein the data capture module comprises an imaging sensor having a field-of-view directed through a window in the head portion of the housing.

5. The handheld data capture device of claim 1, wherein the second frequency is greater than or equal to 1000 Hz and less than or equal to 5000 Hz.

6. The handheld data capture device of claim 5, wherein a sound level produced by the water impermeable membrane is greater than or equal to 65 decibels (dB) at a distance of 2 feet from the water impermeable membrane.

7. The handheld data capture device of claim 1, wherein the water impermeable membrane environmentally seals the hole in the external wall of the housing and the cavity from an environment external to the housing.

8. The handheld data capture device of claim 1, wherein the water impermeable membrane is a water impermeable polymer membrane.

9. The handheld data capture device of claim 1, wherein the housing comprises a support extending across the hole in the external wall of the housing.

10. A data capture device, comprising:

a housing having an external wall and a hole formed through the external wall;

a data capture module positioned within the housing;

an audio device positioned within and mounted to the housing;

a water impermeable membrane secured to an external surface of the external wall of the housing and covering the hole; and a cavity located between the audio device and the water impermeable membrane;

wherein the audio device is configured to resonate at a first frequency and cause the water impermeable membrane to resonate at a second frequency, different than the first frequency.

11. The data capture device of claim 10, wherein the cavity is defined by the audio device, the water impermeable membrane, and the hole in the external wall of the housing.

12. The data capture device of claim 10, wherein the cavity is formed by the housing between the audio device and the hole in the external wall of the housing.

13. The data capture device of claim 10, wherein the data capture module comprises an imaging sensor having a field-of-view directed through a window in the housing.

14. The data capture device of claim 10, wherein:

the housing comprises a lower housing portion with an upper surface facing a product scanning region, an upper housing portion extending above the lower housing portion, a generally horizontal window positioned at the upper surface of the lower housing portion, a generally upright window positioned in the upper housing portion; and the data capture module comprises an imaging sensor having a field-of-view that is at least partially directed through the generally horizontal window or the generally upright window.

15. The data capture device of claim 10, wherein the second frequency is greater than or equal to 1000 Hz and less than or equal to 5000 Hz.

16. The data capture device of claim 15, wherein a sound level produced by the water impermeable membrane is greater than or equal to 65 decibels (dB) at a distance of 2 feet from the water impermeable membrane.

17. The data capture device of claim 10, wherein the water impermeable membrane environmentally seals the hole in the external wall of the housing and the cavity from an environment external to the housing.

18. The data capture device of claim 10, wherein the water impermeable membrane is a water impermeable polymer membrane.

19. The data capture device of claim 10, wherein the housing comprises a support extending across the hole in the external wall of the housing.

20. A device, comprising:

a housing having an external wall and a hole formed through the external wall;

an audio device positioned within and mounted to the housing;

a water impermeable membrane secured to an external surface of the external wall of the housing and covering the hole; and a cavity located between the audio device and the water impermeable membrane;

wherein the audio device is configured to resonate at a first frequency and cause the water impermeable membrane to resonate at a second frequency, different than the first frequency.

21. The device of claim 20, wherein the cavity is defined by the audio device, the water impermeable membrane, and the hole in the external wall of the housing.

22. The device of claim 20, wherein the cavity is formed by the housing between the audio device and the hole in the external wall of the housing.

23. The device of claim 20, wherein the second frequency is greater than or equal to 1000 Hz and less than or equal to 5000 Hz.

24. The device of claim 23, wherein a sound level produced by the water impermeable membrane is greater than or equal to 65 decibels (dB) at a distance of 2 feet from the water impermeable membrane.

25. The device of claim 20, wherein the water impermeable membrane environmentally seals the hole in the external wall of the housing and the cavity from an environment external to the housing.

26. The device of claim 20, wherein the water impermeable membrane is a water impermeable polymer membrane.

27. The device of claim 20, wherein the housing comprises a support extending across the hole in the external wall of the housing.

\* \* \* \* \*